United States Patent
Yang et al.

(10) Patent No.: US 11,870,354 B2
(45) Date of Patent: Jan. 9, 2024

(54) ASYMMETRIC HALF-BRIDGE FLYBACK CIRCUIT-BASED CONVERTER AND CONTROL METHOD THEREOF

(71) Applicant: Meraki Integrated Circuit (Shenzhen) Technology, Ltd., Shenzhen (CN)

(72) Inventors: Shuai Yang, Shenzhen (CN); Wei Dong, Shenzhen (CN); Boyue Luan, Shenzhen (CN); Lin Sheng, Shenzhen (CN)

(73) Assignee: Meraki Integrated Circuit (Shenzhen) Technology, Ltd., Shenzhen (CN)

( * ) Notice: Subject to any disclaimer, the term of this patent is extended or adjusted under 35 U.S.C. 154(b) by 0 days.

(21) Appl. No.: 18/125,718

(22) Filed: Mar. 23, 2023

(65) Prior Publication Data

US 2023/0327564 A1 Oct. 12, 2023

(30) Foreign Application Priority Data

Apr. 12, 2022 (CN) .......................... 202210376200.1

(51) Int. Cl.
*H02M 3/335* (2006.01)
*H02M 3/00* (2006.01)
*H02M 1/088* (2006.01)
*H02M 1/42* (2007.01)

(52) U.S. Cl.
CPC ....... *H02M 3/33571* (2021.05); *H02M 1/088* (2013.01); *H02M 1/4258* (2013.01); *H02M 3/01* (2021.05)

(58) Field of Classification Search
CPC .... H02M 3/33571; H02M 3/01; H02M 1/088; H02M 1/4258
See application file for complete search history.

(56) References Cited

U.S. PATENT DOCUMENTS

| | | | |
|---|---|---|---|
| 5,233,509 A | 8/1993 | Ghotbi | |
| 11,689,115 B2 * | 6/2023 | Yenduri | H02M 7/483 363/126 |
| 2023/0198415 A1 * | 6/2023 | Xu | H02M 3/33523 363/21.12 |

FOREIGN PATENT DOCUMENTS

| | | |
|---|---|---|
| CN | 110649820 A | 1/2020 |
| CN | 112087146 A | 12/2020 |
| CN | 113346753 A | 9/2021 |
| CN | 114039492 A | 2/2022 |
| JP | 2004120863 A | 4/2004 |
| JP | 2006174650 A | 6/2006 |

OTHER PUBLICATIONS

First Office Action issued in related Chinese Application No. 202210376200.1, dated May 13, 2022, 14 pages.
STMicroelectronics, Transition-mode PFC controller, L6562A, 26 pages.
Infineon Technologies, XDP Hybrid-flyback Controller XDPS2201, 75 pages.

* cited by examiner

*Primary Examiner* — Adolf D Berhane
(74) *Attorney, Agent, or Firm* — BAYES PLLC

(57) ABSTRACT

An asymmetric half-bridge flyback circuit-based converter is provided. The converter is configured to convert an alternating current (AC) input at an AC input end into a direct current (DC) within a preset voltage value range. The converter includes a full-bridge rectifier circuit, a half-bridge circuit, a resonant circuit, a transformer, a load output circuit, and a control circuit.

9 Claims, 15 Drawing Sheets

ASYMMETRIC HALF-BRIDGE FLYBACK CIRCUIT-BASED CONVERTER AND CONTROL METHOD THEREOF

CROSS-REFERENCE TO RELATED APPLICATION

The present application claims the benefit of priority to Chinese Patent Application No. 202210376200.1, filed on Apr. 12, 2022, which is hereby incorporated by reference in its entirety.

TECHNICAL FIELD

This application relates to the technical field of alternating current (AC) and direct current (DC) conversion, and in particular, to an asymmetric half-bridge flyback circuit-based converter and a control method thereof.

BACKGROUND

Currently, for an off-line switching power supply with medium/low power, an AC/DC converter mostly adopts a two-stage circuit scheme. As illustrated in FIG. 1, the two-stage circuit scheme incudes a BOOST-based power factor correction circuit and a high-frequency resonant half-bridge converter circuit isolating DC/DC. The circuits in the two-stage circuit scheme operate independently and implement their own functions. However, in chargers with medium/low power, universal serial bus power delivery (USB PD), and other applications, there are obvious requirements on the size and cost of a switching power supply system. However, the topology and circuit components of the two-stage circuit scheme are fixed, and it is basically impossible to change greatly; therefore, the volume and cost of the system cannot be reduced while various functions are ensured.

In addition, how to realize zero-voltage switch-on or zero-current switch-off of a switch, i. e. to realize the function of soft switching, is also a technical problem to be solved.

SUMMARY

The main technical problem solved by the present disclosure is how to achieve functions of high power factor rectification and DC/DC isolation on a converter.

According to a first aspect, an asymmetric half-bridge flyback circuit-based converter is provided in some embodiments. The converter is configured to convert an alternating current (AC) input at an AC input end into a direct current (DC) within a preset voltage value range, the converter includes: a full-bridge rectifier circuit, a half-bridge circuit, a resonant circuit, a transformer, a load output circuit, and a control circuit.

The full-bridge rectifier circuit is configured to perform full-bridge rectification on the AC input at the AC input end to obtain a unidirectional pulsating DC and output the unidirectional pulsating DC to the half-bridge circuit.

The half-bridge circuit includes an upper bridge switch and a lower bridge switch, the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer.

The resonant circuit is configured to perform auxiliary communication on the primary side of the transformer. The transformer is configured to convert the AC on the primary side of the transformer into an AC having a preset voltage value on a secondary side. The load output circuit is configured to convert the AC having the preset voltage value on the secondary side of the transformer into a DC and output the DC. The control circuit is configured to obtain a DC voltage signal actually output by the converter and a preset output DC voltage signal, determine a voltage loop output value of the converter according to the DC voltage signal actually output and the preset output DC voltage signal, and generate a drive signal for the upper bridge switch and a drive signal for the lower bridge switch of the half-bridge circuit according to the voltage loop output value of the converter, an instantaneous voltage value of the AC input at the AC input end, an instantaneous current value of a current signal on the primary side of the transformer, to make the current signal on the primary side of the transformer change according to the regularity of the AC voltage signal input at the AC input end, where the upper bridge switch and the lower bridge switch are configured to be switched on alternately. The control circuit is configured to detect in real time level information of the drive signal for the upper bridge switch, and generate a trigger signal after a preset time elapsed upon detecting that the drive signal for the upper bridge switch is at a low level. The control circuit is configured to output a low-level drive signal to the lower bridge switch in response to the trigger signal to switch off the lower bridge switch, and output a high-level drive signal to the upper bridge switch after a dead time to switch on the upper bridge switch. The preset time is determined according to a difference between a positive peak current value and a negative peak current value on the primary side of the transformer, an instantaneous voltage value of the DC output by the converter, and an excitation inductance of the transformer.

According to some embodiments, the preset time is determined according to a preset peak current value of the lower bridge switch, the instantaneous voltage value of the DC output by the converter, and an excitation inductance parameter of the transformer includes: the preset time $T_{LG}$ is determined according to the following formula:

$$T_{LG} = \frac{(I_{set} - I_{neg}) * Lmag}{Vout * Np}$$

Where $I_{set}$ represents the positive peak current value on the primary side of the transformer, $I_{neg}$ represents the negative peak current value on the primary side of the transformer, Lmag represents the excitation inductance of the transformer, Vout represents the instantaneous voltage value of the DC output by the converter, Np represents a turn ratio between the primary side and secondary side of the transformer.

According to some embodiments, the drive signal for the upper bridge switch and the drive signal for the lower bridge switch of the half-bridge circuit is generated according to the voltage loop output value of the converter, the instantaneous voltage value of the AC input at the AC input end, the instantaneous current value of the current signal on the primary side of the transformer includes the following.

A peak current given value of the transformer is obtained by multiplying the voltage loop output value with an absolute value of the instantaneous voltage value of the AC input at the AC input end.

The drive signal for the upper bridge switch and the drive signal for the lower bridge switch of the half-bridge circuit are generated according to the peak current given value of the transformer and the instantaneous current value of the current signal on the primary side of the transformer, to make the current signal on the primary side of the transformer change according to the regularity of the AC voltage signal input at the AC input end.

According to some embodiments, the drive signal for the upper bridge switch and the drive signal for the lower bridge switch of the half-bridge circuit is generated according to the peak current given value of the transformer and the instantaneous current value of the current signal on the primary side of the transformer includes the following.

The peak current given value of the transformer is compared with the instantaneous current value of the current signal on the primary side of the transformer. The high-level drive signal is output to the upper bridge switch to drive the upper bridge switch to be switched on, if the peak current given value of the transformer is greater than the instantaneous current value of the current signal on the primary side of the transformer, where the drive signal for the upper bridge switch and the drive signal for the lower bridge switch are complementary. The low-level drive signal is output to the upper bridge switch to drive the upper bridge switch to be switched off, if the peak current given value of the transformer is less than the instantaneous current value of the current signal on the primary side of the transformer, where the drive signal for the upper bridge switch and the drive signal for the lower bridge switch are complementary.

According to some embodiments, the control circuit includes: a first subtractor, a voltage stabilizer, a first multiplier, an absolute value module, a first comparator, a trigger, and a drive signal generating module.

The first subtractor is configured to subtract the DC voltage signal actually output by the converter from the preset output DC voltage signal, and output an output voltage error value to the voltage stabilizer. The voltage stabilizer is configured to amplify and process the output voltage error value, and output the voltage loop output value to the first subtractor. The absolute value module is configured to calculate an absolute value of the instantaneous voltage value of the AC input at the AC input end, and output the absolute value of the instantaneous voltage value of the AC to the first multiplier. The first multiplier is configured to multiply the instantaneous voltage value of the AC with the voltage loop output value of the converter to obtain the peak current given value of the transformer, and output the peak current given value of the transformer to the first comparator. The first comparator is configured to output a high-level signal to the trigger when the peak current given value of the transformer is greater than the instantaneous current value of the current signal on the primary side of the transformer, and output a low-level signal to the trigger when the peak current given value of the transformer is less than the instantaneous current value of the current signal on the primary side of the transformer. The trigger is configured to receive the signal output by the first comparator and output a PWM signal to the drive signal generating module. The drive signal generating module is configured to generate two complementary PWM drive signals according to the PWM signal, and output the two complementary PWM drive signals to the upper bridge switch and the lower bridge switch, respectively.

According to some embodiments, the control circuit further includes: a second subtractor, a second multiplier, a divider, an integrator, and a second comparator.

The second subtractor is configured to subtract the negative peak current value from the positive peak current value of the primary side of the transformer to obtain a difference between the positive peak current value and the negative peak current value of the primary side of the transformer, and output the difference to the second multiplier. The second multiplier is configured to multiply the excitation inductance of the transformer with the difference between the positive peak current value and the negative peak current value, and output a multiplication result to the divider. The divider is configured to divide the multiplication result output by the second multiplier by a product of the instantaneous voltage value of the DC output by the converter and a turn ratio of the transformer to obtain a preset time, and output the preset time to the second comparator. The integrator is configured to count an actual time in which the drive signal for the upper bridge switch is at low-level, and output the actual time to the second comparator. The second comparator is configured to output the low-level signal to the trigger when the actual time is less than or equal to the preset time, and output the high-level signal to the trigger when the actual time is greater than the preset time.

According to some embodiments, the full-bridge rectifier circuit includes: a diode D1, a diode D2, a diode D3, a diode D4, and a capacitor C1.

An anode of the diode D1 and a cathode of the diode D2 are connected to a negative electrode of the AC input end, an anode of the diode D3 and a cathode of diode D4 are connected to a positive electrode of the AC input end, a cathode of the diode D1 and a cathode of the diode D3 are connected to one end of the capacitor C1, and an anode of the diode D2 and an anode of diode D4 are connected to the other end of the capacitor C1.

In some embodiments, the half-bridge circuit includes: an upper bridge switch Q1 and a lower bridge switch Q2. The upper bridge switch Q1 includes a first electrode, a second electrode, and a control electrode. The first electrode of the upper bridge switch Q1 is connected to a positive output end of the full-bridge rectifier circuit, the second electrode of the upper bridge switch Q1 is connected to one end of the resonant circuit, the control electrode of the upper bridge switch Q1 is connected to the control circuit, the control electrode of the upper bridge switch Q1 is configured to receive the drive signal output by the control circuit to control the upper bridge switch Q1 to be switched on or switched off. The lower bridge switch Q2 includes a first electrode, a second electrode, and a control electrode, the first electrode of the lower bridge switch Q2 is connected to one end of the resonant circuit, the second electrode of the lower bridge switch Q2 is connected to the other end of the resonant circuit and a negative output end of the full-bridge rectifier circuit, the control electrode of the lower bridge switch Q2 is connected to the control circuit, the control electrode of the lower bridge switch Q2 is configured to receive the drive signal output by the control circuit to control the lower bridge switch Q2 to be switched on or switched off.

In some embodiments, the resonant circuit includes an inductor L1 and a capacitor C2. One end of the inductor L1 is connected to the second electrode of the upper bridge switch Q1, the other end of the inductor L1 is connected to one end of the primary side of the transformer, the other end of the primary side of the transformer is connected to one end of the capacitor C2, and the other end of the capacitor C2 is connected to the second electrode of the lower bridge switch Q2.

In some embodiments, the load output circuit includes: a diode D5 and a capacitor C3. An anode of the diode D5 is connected to one end of the secondary side of the transformer, a cathode of the diode D5 is connected to one end of the capacitor C3, and the other end of capacitor C3 is connected to the other end of the secondary side of the transformer.

According to a second aspect, an asymmetric half-bridge flyback circuit-based converter is provided, where the converter is configured to convert an AC input at an AC input end into a DC within a preset voltage value range, the converter includes: a full-bridge rectifier circuit, a half-bridge circuit, a resonant circuit, a transformer, a load output circuit, and a control circuit.

The full-bridge rectifier circuit is configured to perform full-bridge rectification on the AC input at the AC input end to obtain a unidirectional pulsating DC and output the unidirectional pulsating DC to the half-bridge circuit. The half-bridge circuit includes an upper bridge switch and a lower bridge switch, the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer. The resonant circuit is configured to perform auxiliary communication on the primary side of the transformer. The transformer is configured to convert the AC on the primary side of the transformer into an AC having a preset voltage value on a secondary side. The load output circuit is configured to convert the AC having the preset voltage value on the secondary side of the transformer into a DC and output the DC. The control circuit is configured to generate a drive signal for the upper bridge switch and a drive signal for the lower bridge switch of the half-bridge circuit, and output the drive signals to the upper bridge switch and the lower bridge switch to control the upper bridge switch and the lower bridge switch to be switched on alternately. The control circuit is configured to check the level information of the drive signal for the upper bridge switch in real time. If the drive signal for the upper bridge switch is at a low level, a trigger signal is generated after a preset time elapsed. In response to the trigger signal, the control circuit is configured to output a low-level drive signal to the lower bridge switch to turn off the lower bridge switch, and at the same time, output a high-level drive signal to the upper bridge switch to turn on the upper bridge switch, where the preset time is determined according to a difference between a positive peak current and a negative peak current, an instantaneous voltage value of the DC output by the transformer, and an excitation inductance of the transformer.

According to a third aspect, an asymmetric half-bridge flyback circuit-based converter is provided in some embodiments, where the converter is configured to convert an AC input at an AC input end into a DC within a preset voltage value range, the converter includes: a full-bridge rectifier circuit, a half-bridge circuit, a resonant circuit, a transformer, a load output circuit, and a control circuit.

The full-bridge rectifier circuit is configured to perform full-bridge rectification on the AC input at the AC input end to obtain a unidirectional pulsating DC and output the unidirectional pulsating DC to the half-bridge circuit. The half-bridge circuit includes an upper bridge switch and a lower bridge switch, the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer. The resonant circuit is configured to perform auxiliary communication on the primary side of the transformer. The transformer is configured to convert the AC on the primary side of the transformer into an AC having a preset voltage value on a secondary side. The load output circuit is configured to convert the AC having the preset voltage value on the secondary side of the transformer into a DC and output the DC. The control circuit is configured to obtain a DC voltage signal actually output by the converter and a preset output DC voltage signal, determine a voltage loop output value of the converter according to the DC voltage signal actually output and the preset output DC voltage signal, and generate a drive signal for the upper bridge switch and a drive signal for the lower bridge switch of the half-bridge circuit according to the voltage loop output value, an instantaneous voltage value of the AC input at the AC input end, an instantaneous current value of a current signal on the primary side of the transformer, to make the current signal on the primary side of the transformer change according to the regularity of the AC voltage signal input at the AC input end.

According to a fourth aspect, a control method for an asymmetric half-bridge flyback circuit-based converter is provided according to some embodiments. The converter is configured to convert an AC input at an AC input end into a DC within a preset voltage value range. The converter includes: a full-bridge rectifier circuit, a half-bridge circuit, a resonant circuit, a transformer, a load output circuit, and a control circuit. The full-bridge rectifier circuit is configured to perform full-bridge rectification on the AC input at the AC input end to obtain a unidirectional pulsating DC and output the unidirectional pulsating DC to the half-bridge circuit. The half-bridge circuit includes an upper bridge switch and a lower bridge switch, the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer. The resonant circuit is configured to perform auxiliary communication on the primary side of the transformer. The transformer is configured to convert the AC on the primary side of the transformer into an AC having a preset voltage value on a secondary side. The load output circuit is configured to convert the AC having the preset voltage value on the secondary side of the transformer into a DC and output the DC. The control circuit is configured to generate a drive signal for the upper bridge switch and a drive signal for the lower bridge switch of the half-bridge circuit, and outputs the drive signals to the upper bridge switch and the lower bridge switch to control the upper bridge switch and the lower bridge switch to be switched on alternately.

The control method includes: obtaining a DC voltage signal actually output by the converter and a preset output DC voltage signal; determining a voltage loop output value of the converter according to the DC voltage signal actually output and the preset output DC voltage signal; generating the drive signal for the upper bridge switch and the drive signal for the lower bridge switch of the half-bridge circuit according to the voltage loop output value of the converter, an instantaneous voltage value of the AC input at the AC input end, an instantaneous current value of a current signal on the primary side of the transformer, to make the current signal on the primary side of the transformer change according to regularity of the AC voltage signal input at the AC input end, where the upper bridge switch and the lower bridge switch are configured to be switched on alternately; detecting in real time level information of the drive signal for the upper bridge switch; and generating a trigger signal after a preset time elapsed upon detecting that the drive signal of the upper bridge switch is at a low level, outputting a low-level drive signal to the lower bridge switch in response to the trigger signal to switch off the lower bridge switch, and outputting a high-level drive signal to the upper bridge switch to switch on the upper bridge switch.

According to the asymmetric half-bridge flyback circuit-based converter and the control method thereof, where the converter includes the full-bridge rectifier circuit, the half-bridge circuit, the resonant circuit, the transformer, the load output circuit, and the control circuit, the control circuit can generate the drive signal for the upper bridge switch and the drive signal for the lower bridge switch of the half-bridge circuit according to the voltage loop output value of the converter, the instantaneous voltage value of the AC input at the AC input end, the instantaneous current value of the current signal on the primary side of the transformer, to make the current signal on the primary side of the transformer change according to the regularity of the AC voltage signal input at the AC input end, so as to achieve high power factor rectification. In addition, the function of isolating DC/DC is achieved through the transformer. Thus, the converter provided herein can achieve the functions of high power factor rectification and DC/DC isolation on one converter.

In addition, the control circuit can determine the on-duration of the lower bridge switch according to the difference between the positive peak current value and the negative peak current value on the primary side of the transformer, the instantaneous voltage value of the DC output by the converter, and the excitation inductance of the transformer, so as the upper bridge switch and the lower bridge switch can achieve the soft switching function.

DETAILED DESCRIPTION

Figure 1:
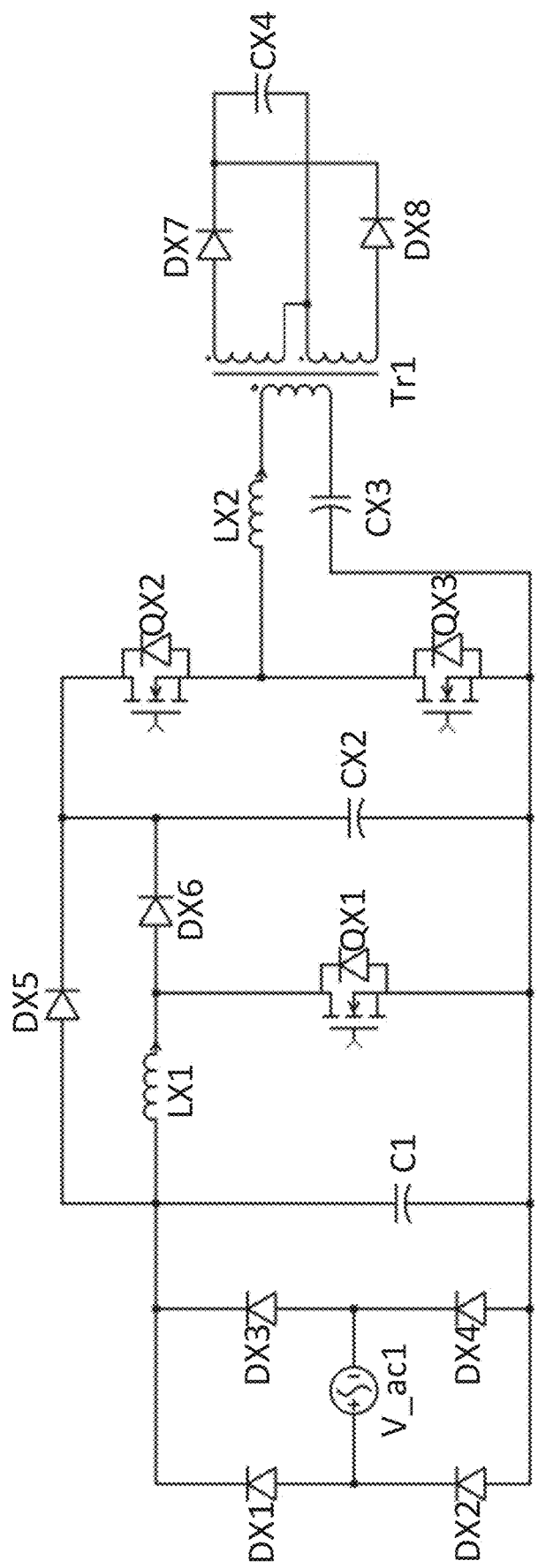
FIG. 1 shows a circuit schematic diagram of a two-stage circuit scheme-based AC/DC converter in the related art.

The present disclosure will be described in further detail below with reference to the following detailed description taken in conjunction with the accompanying drawings, in which like elements in different embodiments are designated by like reference numerals. In the embodiments described below, numerous details are set forth to provide a better understanding of the application. However, one skilled in the art can readily recognize that some of the features may be omitted in different circumstances or may be replaced by other elements, materials, and methods. In some cases, in order to prevent the core part of the present application from being overwhelmed by too many descriptions, some operations related to the present application are not shown or described in the description, and for those skilled in the art, it is not necessary to describe these related operations in detail, and they can clearly and completely understand the related operations according to the description herein and general technical knowledge in the art.

In addition, features, operations, or characteristics described herein may be combined in any suitable manner to form various embodiments. The steps or actions in the method description can also be exchanged or adjusted in sequence in a way obvious to those skilled in the art. Therefore, various orders in the description and the drawings are only intended to clearly describe a certain embodiment, and are not intended to indicate a necessary order unless otherwise indicated that a certain order must be followed.

Sequential references applied herein to components, such as "first," "second," etc., are used merely to distinguish between described objects and do not have any ordinal or technical meaning. The expressions "connected" and "coupled" in the present application, unless specified otherwise, both include direct connection and indirect connection (coupling).

Figure 2:
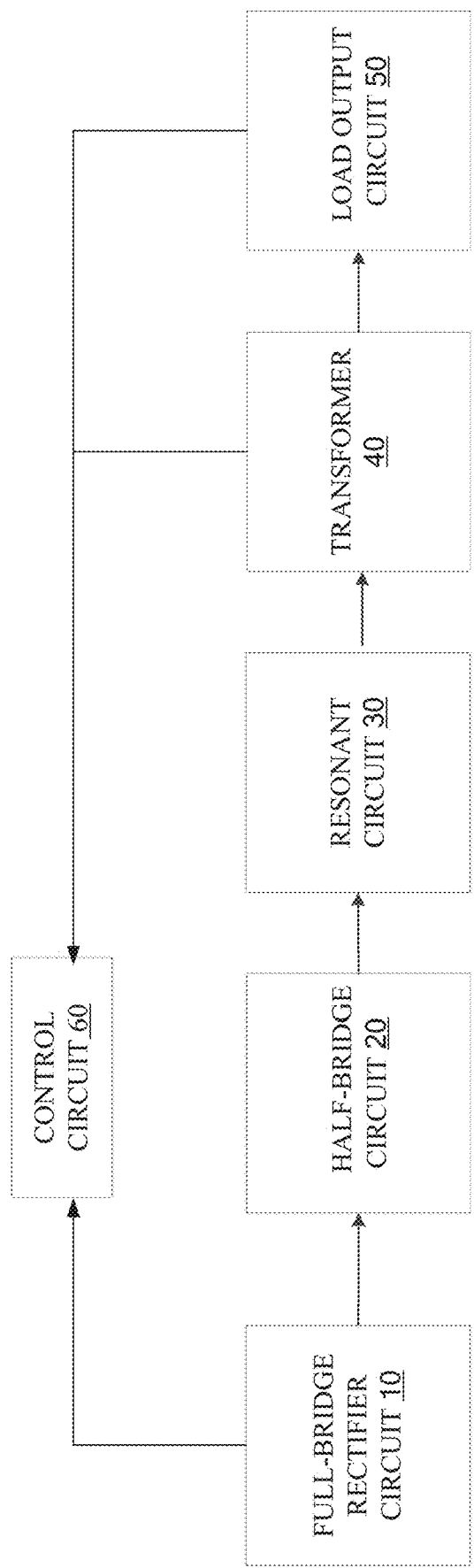
FIG. 2 shows a structure schematic diagram of a converter achieving functions of high power factor rectification and DC/DC isolation according to an embodiment.
Figure 3:
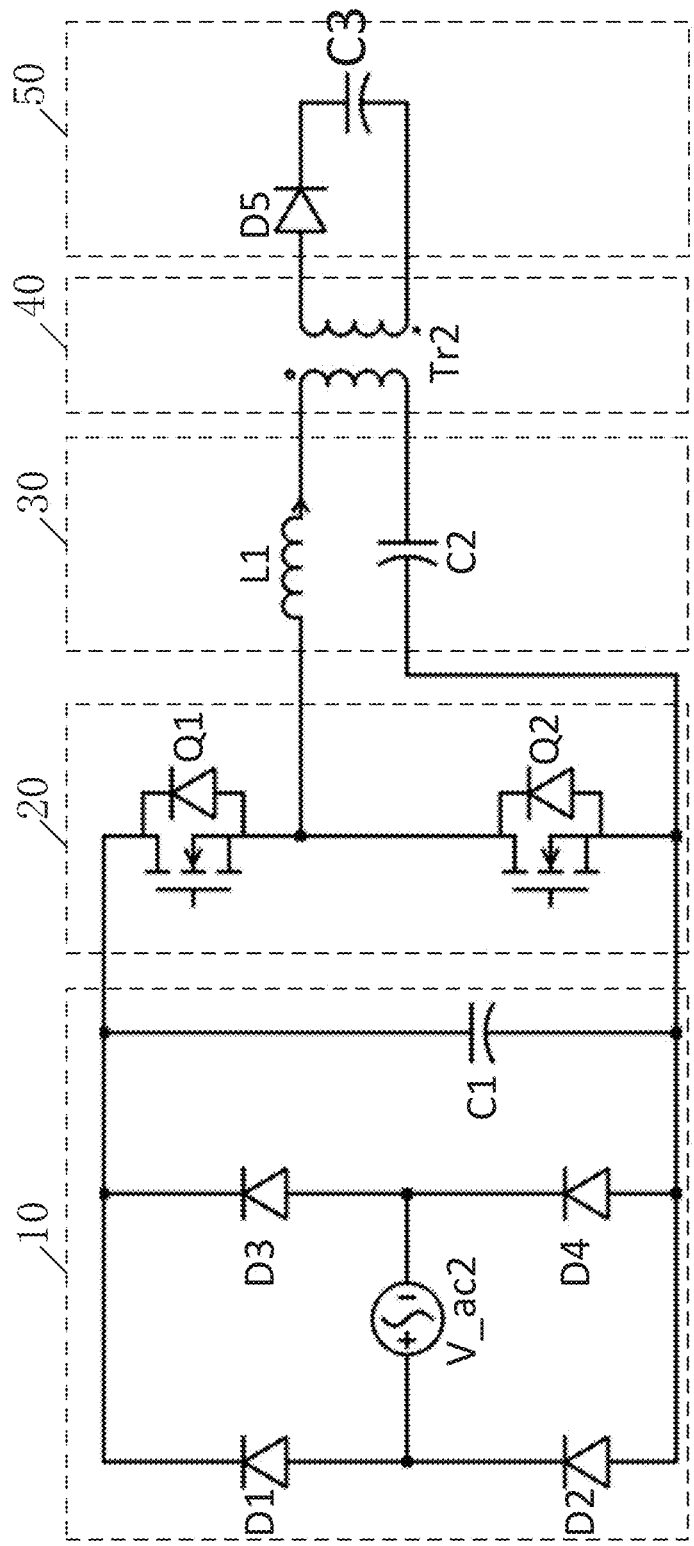
FIG. 3 shows a circuit schematic diagram of the converter illustrated in FIG. 2.

FIG. 2 shows a structure schematic diagram of a converter achieving functions of high power factor rectification and DC/DC isolation (in the following, "converter" for short). The converter provided herein is an asymmetric half-bridge flyback circuit-based converter for achieving isolation-conversion of single-stage AC/DC. As shown in FIG. 3, compared with the circuit topology of FIG. 1 in the related art, the BOOST rectifier converter circuit is omitted, and the converter provided in the embodiment thus has a smaller size and lower cost.

As shown in FIG. 2 and FIG. 3, the converter provided in the embodiments includes a full-bridge rectifier circuit 10, a half-bridge circuit 20, a resonant circuit 30, a transformer 40, a load output circuit 50, and a control circuit 60.

The full-bridge rectifier circuit 10 includes an AC positive input end, an AC negative input end, a rectification positive output end, and a rectification negative output end, the AC positive input end and the AC negative input end are connected with an AC input end for inputting AC. The full-bridge rectifier circuit 10 is configured to perform full-bridge rectification on the AC input at the AC input end to obtain a unidirectional pulsating DC, and output the unidirectional pulsating DC to the half-bridge circuit 20. The rectification positive output end and the rectification negative output end are configured to output rectified unidirectional pulsating DC to the half-bridge circuit 20.

In one embodiment, the full-bridge rectifier circuit 10 includes a diode D1, a diode D2, a diode D3, a diode D4, and a capacitor C1. An anode of the diode D1 and a cathode of the diode D2 are connected to a negative electrode of the AC input end, an anode of the diode D3 and a cathode of the diode D4 are connected to a positive electrode of the AC input end, a cathode of the diode D1 and a cathode of the diode D3 are connected to one end of the capacitor C1, and an anode of the diode D2 and an anode of the diode D4 are connected to the other end of the capacitor C1. In this embodiment, the diode D1 and the diode D4 are a group of diodes that are switched on or switched off at the same time, the diode D2 and the diode D3 are another group of diodes that are switched on or switched off at the same time, the diode D1 (diode D4) and the diode D2 (diode D3) are switched on alternately, the capacitor C1 is connected in parallel at the output end of the full-bridge rectifier circuit 10, the capacitor C1 is configured to further filter the unidirectional pulsating DC output by the full-bridge rectifier circuit 10. In other embodiments, the full-bridge rectifier circuit 10 may also be any existing circuit capable of AC rectification. It should be noted that, the AC input at the AC input end is an AC with a sine or cosine change.

The half-bridge circuit 20 includes a positive input end, a negative input end, an upper bridge switch, a lower bridge switch, a positive output end, and a negative output end. The positive input end of the half-bridge circuit 20 is connected with the rectification positive output end of the full-bridge rectifier circuit 10, the negative input end of the half-bridge circuit 20 is connected with the rectification negative output end of the full-bridge rectifier circuit 10. The half-bridge circuit 20 is configured to convert alternately, by switching on the upper bridge switch and the lower bridge switch alternately, the unidirectional pulsating DC output by the full-bridge rectifier circuit 10 into an AC having a voltage amplitude changing with a waveform of an AC voltage input at the AC input end. Switching on and switching off of the upper bridge switch and the lower bridge switch are controlled by the control circuit 60. The positive output end and the negative output end of the half-bridge circuit 20 are configured to output the AC having the voltage amplitude changing with the waveform of the AC voltage input at the AC input end to a primary side of the transformer 40.

In one embodiment, the half-bridge circuit 20 includes an upper bridge switch Q1 and a lower bridge switch Q2. The upper bridge switch Q1 includes a first electrode, a second electrode, and a control electrode, the first electrode of the upper bridge switch Q1 is connected to a positive output end of the full-bridge rectifier circuit, the second electrode of the upper bridge switch Q1 is connected to one end of the resonant circuit 30, the control electrode of the upper bridge switch Q1 is connected to the control circuit 60, the control electrode of the upper bridge switch Q1 is configured to receive the drive signal output by the control circuit 60 to control the upper bridge switch Q1 to be switched on/off. The lower bridge switch Q2 includes a first electrode, a second electrode, and a control electrode, the first electrode of the lower bridge switch Q2 is connected to one end of the resonant circuit, the second electrode of the lower bridge switch Q2 is connected to the other end of the resonant circuit and a negative output end of the full-bridge rectifier circuit, the control electrode of the lower bridge switch Q2 is connected to the control circuit 60, the control electrode of the lower bridge switch Q2 is configured to receive the drive signal output by the control circuit 60 to control the lower bridge switch Q2 to be switched on/off.

The switch in the present application is a three-terminal transistor, and the three terminals of the transistor are a control electrode, a first electrode, and a second electrode. The transistor may be a bipolar transistor, a field effect transistor, or the like. For example, when the transistor is a bipolar transistor, the control electrode refers to a base electrode of the bipolar transistor, the first electrode may be a collector or an emitter of the bipolar transistor, and accordingly, the second electrode may be the emitter or the collector of the bipolar transistor. When the transistor is a field effect transistor, the control electrode refers to the gate electrode of the field effect transistor, the first electrode may be the drain electrode or the source electrode of the field effect transistor, and accordingly, the second electrode may be the source electrode or the drain electrode of the field effect transistor. In some embodiments, the upper bridge switch Q1 and the lower bridge switch Q2 are both N-type field effect transistors, the first electrode is a drain electrode, the second electrode is a source electrode, and the control electrode is a gate electrode. When the voltage on the gate is at a high level, the upper bridge switch Q1 and the lower bridge switch Q2 are switched on; otherwise, when the voltage on the gate is at a low level, the upper bridge switch Q1 and the lower bridge switch Q2 are switched off.

The resonant circuit 30 is configured to perform auxiliary communication on the primary side of the transformer. In one embodiment, the resonant circuit 30 includes an inductor L1 and a capacitor C2. One end of the inductor L1 is connected to the second electrode of the upper bridge switch Q1, the other end of the inductor L1 is connected to one end of the primary side of the transformer, the other end of the primary side of the transformer is connected to one end of the capacitor C2, and the other end of the capacitor C2 is connected to the second electrode of the lower bridge switch Q2. In this embodiment, by controlling the switch-on and switch-off of the first switch Q1 and the second switch Q2, the inductor L1 and the capacitor C2 in the resonant circuit 30 can resonate. In this way, both the current and the voltage on the primary side of the transformer 40 are sinusoidal, thereby implementing a zero-voltage switch-on or zero-current switch-off function of the upper bridge switch Q1 and the lower bridge switch Q2, implementing soft switching, reducing a switching loss of the switch, and improving operating efficiency of the converter.

The transformer 40 is configured to convert the AC on the primary side of the transformer 40 into an AC having a preset voltage value on a secondary side. The transformer 40 first stores in an air gap the current flowing through an excitation inductor, and based on the electromagnetic induction principle, the voltage of the excitation inductor of the primary side is then transferred and output on the secondary side according to the turn ratio and the direction of dotted terminals.

The load output circuit 50 is configured to convert the AC having the preset voltage value on the secondary side of the transformer into a DC and output the DC. Since the AC on the secondary side of the transformer 40 is the AC with constant voltage and opposite direction, the load output circuit 50 is configured to convert the AC on the secondary side of the transformer 40 into DC having a preset voltage value and then output the DC.

In one embodiment, the load output circuit 50 includes a diode D5 and a capacitor C3. An anode of the diode D5 is connected to one end of the secondary side of the transformer, a cathode of the diode D5 is connected to one end of the capacitor C3, and the other end of the capacitor C3 is connected to the other end of the secondary side of the transformer. In this way, the voltage across the capacitor C3 is the voltage of the DC output by the converter, with aid of the unidirectional continuity of the diode D5, the voltage across the capacitor C3 is a unidirectional electrical signal (DC), thus the AC having the preset voltage value on the secondary side of the transformer 40 is converted into DC and output.

The output end of the control circuit 60 is connected to the control electrode of the upper bridge switch Q1 and the control electrode of the lower bridge switch Q2 of the half-bridge circuit 20. The control circuit 60 is configured to output the drive signal for the upper bridge switch Q1 and the drive signal for the lower bridge switch Q2, to drive the upper bridge switch Q1 and the lower bridge switch Q2 to be switched on alternately.

The control circuit 60 provided in this embodiment can achieve the functions of high power factor rectification and soft switching by controlling the on-duration of the upper bridge switch Q1 and the lower bridge switch Q2 respectively. The following is a detailed description of how the control circuit 60 controls on and off of the upper bridge switch Q1 and the lower bridge switch Q2, as well as how the control circuit 60 controls the on-duration of the lower bridge switch Q2.

First, how the control circuit 60 controls on and off of the upper bridge switch Q1 and the lower bridge switch Q2 is described.

The control circuit 60 provided in this embodiment respectively controls on and off of the upper bridge switch Q1 and the lower bridge switch Q2, thus the current signal on the primary side of the transformer 40 changes according to the regularity of the AC voltage signal input at the AC input end, thus achieving high power factor rectification. For example, the AC voltage signal input at the AC input end is a sine signal, and the current signal on the primary side of the transformer 40 also changes according to a sine signal law with the AC voltage signal, such that the current signal on the primary side of the transformer 40 and the AC voltage signal input at the AC input end have a relatively small phase difference, that is, an input voltage and an output current of a rectifier module consisting of the full-bridge rectifier circuit and the half-bridge circuit has a smaller phase difference, thus achieves high power factor rectification.

In the following, a control method for the control circuit 60 to output an appropriate drive signal to make the current signal on the primary side of the transformer 40 change according to the regularity of the AC voltage signal input at the AC input end is described.

Figure 4:
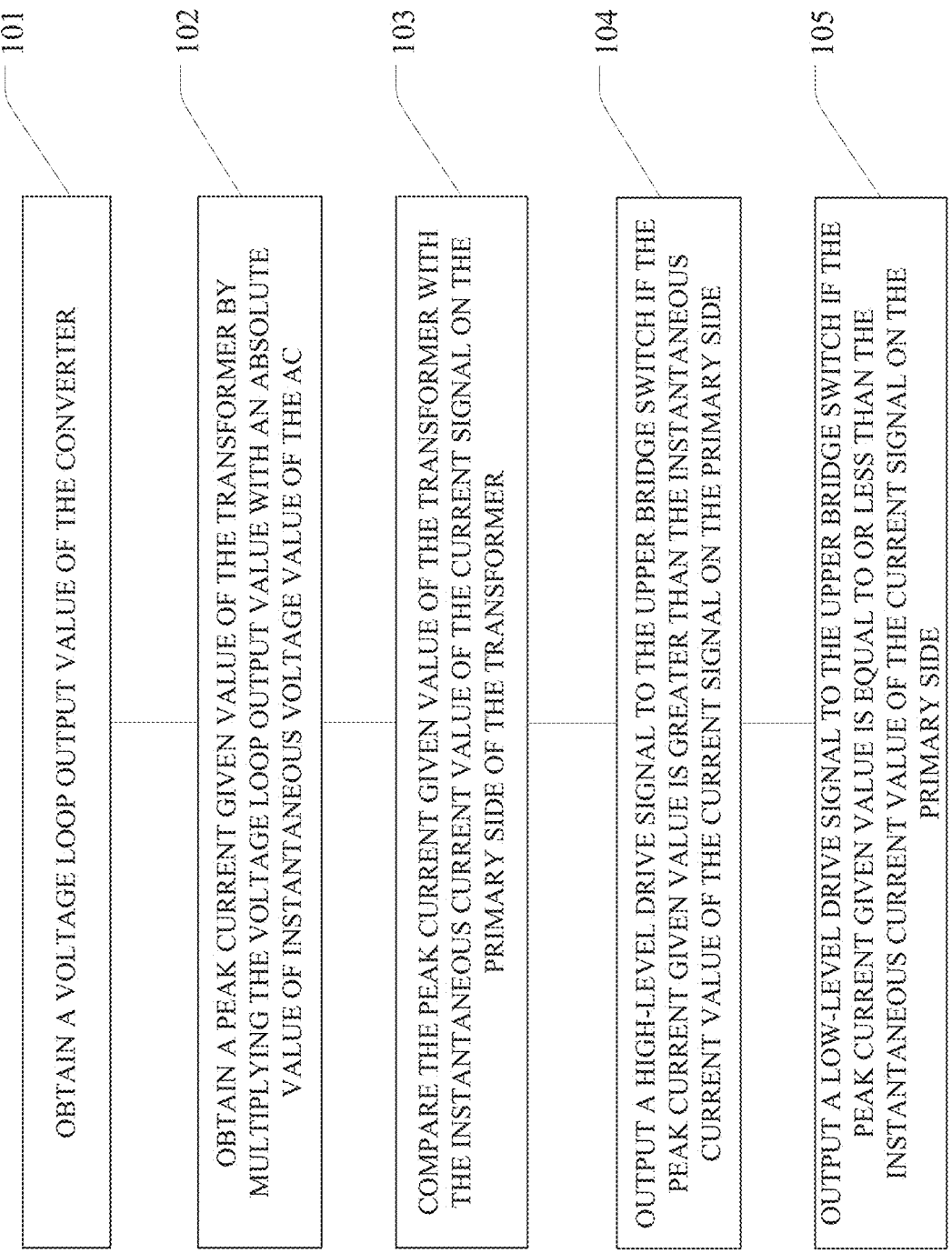
FIG. 4 shows a flowchart of a control method for a converter achieving the functions of high power factor rectification and DC/DC isolation.

FIG. 4 shows a flowchart of a control method for an asymmetric half-bridge flyback circuit-based converter according to an embodiment, in the following, "control method" for short. The control method includes step 101 to step 501, as detailed below.

Step 101: a DC voltage signal actually output by the converter and a preset output DC voltage signal are obtained, and a voltage loop output value of the converter is determined according to the DC voltage signal actually output and the preset output DC voltage signal. Generally, the control strategy of the converter includes a voltage loop and a current loop, where the voltage loop output value is the output value of the voltage loop, that is, a result obtained after amplifying and stabilizing an error value between the actual output voltage of converter and the given voltage.

Step 102: an instantaneous voltage value of the AC input at the AC input end is obtained, and a peak current given value of the transformer 40 is obtained by multiplying the voltage loop output value with an absolute value of the instantaneous voltage value of the AC input at the AC input end. In this embodiment, the result is obtained by multiplying the output value of the voltage loop with the sampled value of the AC input at the AC input end as the peak current given value of the transformer 40.

Step 103: an instantaneous current value of a current signal on the primary side of the transformer 40 is obtained, the peak current given value of the transformer 40 is compared with the instantaneous current value of the current signal on the primary side of the transformer 40. Since the peak value of the current signal on the primary side of the transformer 40 should be less than or equal to the peak current given value of the transformer, the two current values need to be compared.

Step 104: if the peak current given value of the transformer 40 is greater than the instantaneous current value of the current signal on the primary side of the transformer 40, a high-level drive signal is output to the upper bridge switch Q1 to drive the upper bridge switch Q1 to be switched on, where the drive signal for the lower bridge switch Q2 and the drive signal for the upper bridge switch Q1 are complementary.

Step 105: if the peak current given value of the transformer 40 is less than or equal to the instantaneous current value of the current signal on the primary side of the transformer 40, a low-level drive signal is output to the upper bridge switch Q1 to drive the upper bridge switch Q1 to be switched off, where the drive signal for the upper bridge switch Q1 and the drive signal for the lower bridge switch Q2 are complementary.

Figure 5:
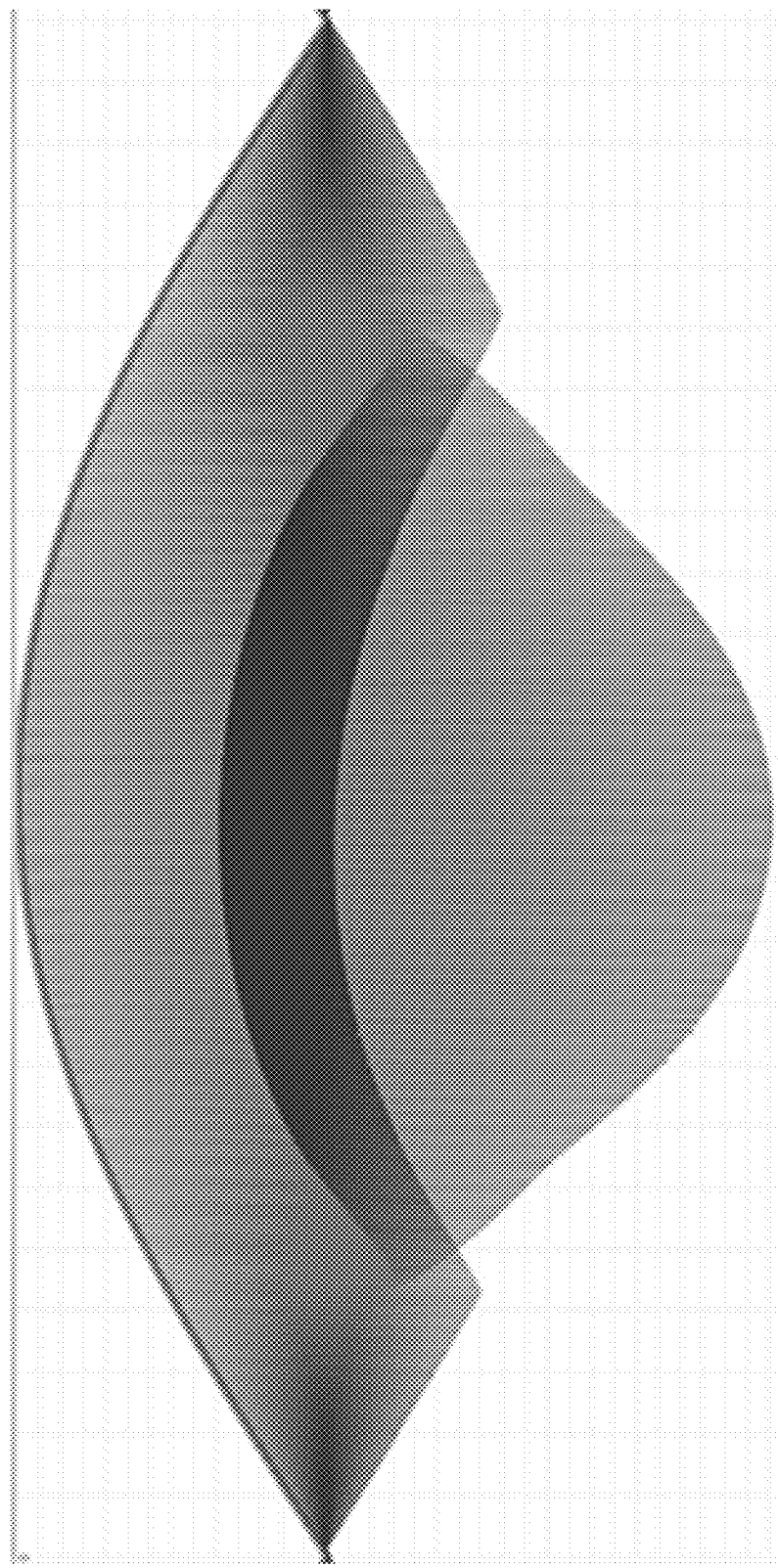
FIG. 5 shows a schematic diagram of simulation comparison between a peak current given value of a transformer and a current signal on a primary side of the transformer according to an embodiment.
Figure 6:
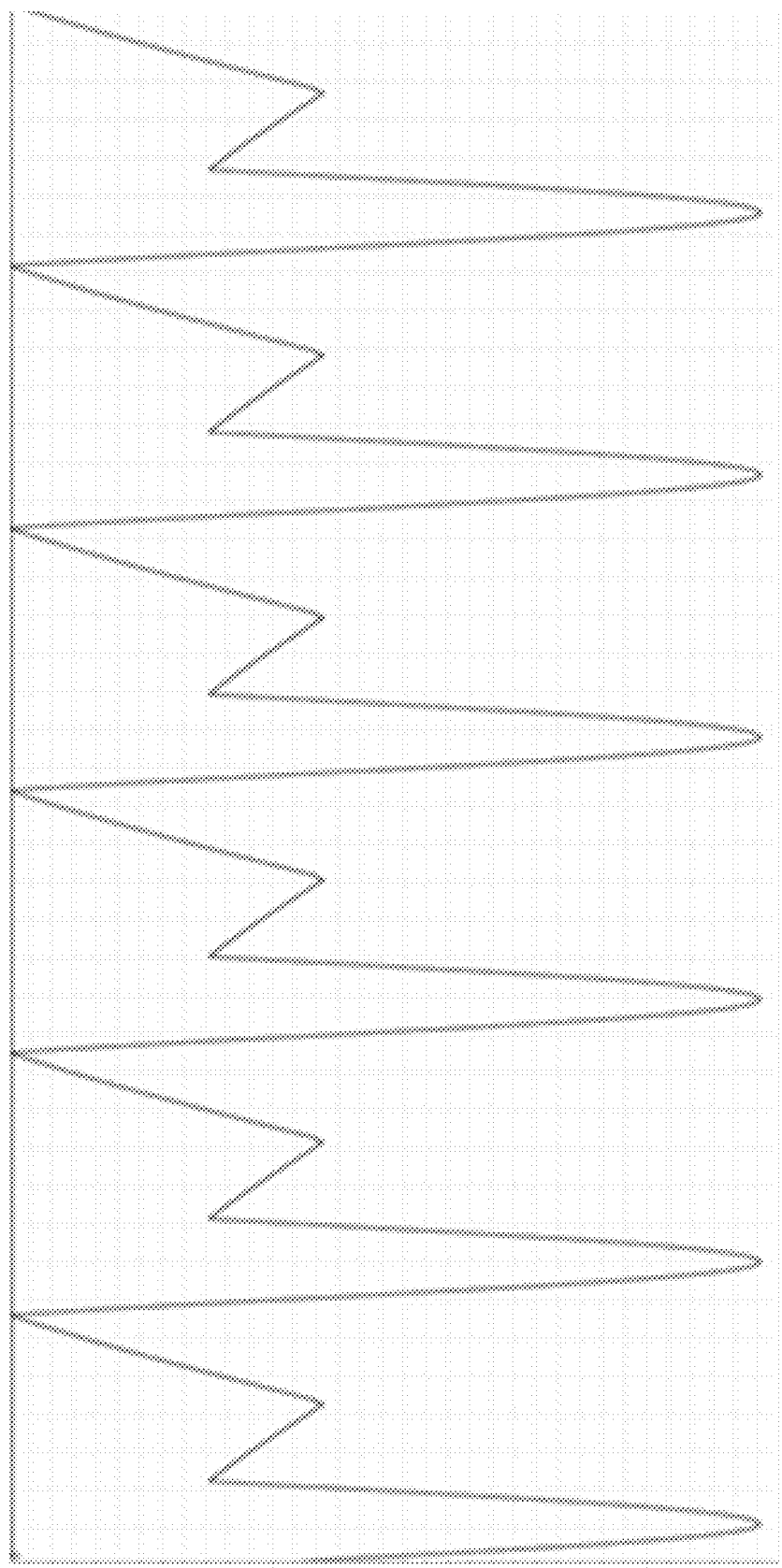
FIG. 6 shows the changing trend of the current flowing into the AC input end.

As shown in FIG. 5, the upper-most envelope in FIG. 5 gives the transformer peak current value, and the waveform under the envelope is the current signal that actually flows through the primary side of the transformer 40. As can be seen, through comparison between the peak current given value of the transformer 40 and the instantaneous current value of the current signal on the primary side of the transformer 40, a high gain current loop is realized, and thus making the current signal on the primary side of the transformer follow a waveform of the AC voltage signal input at the AC input end. FIG. 6 shows the changing trend of the current flowing into the AC input end. As can be seen from FIG. 6, the changing trend of the current flowing into the AC input follows a sine wave law as a whole, and is similar to the changing trend of the AC input at the AC input end.

Figure 7:
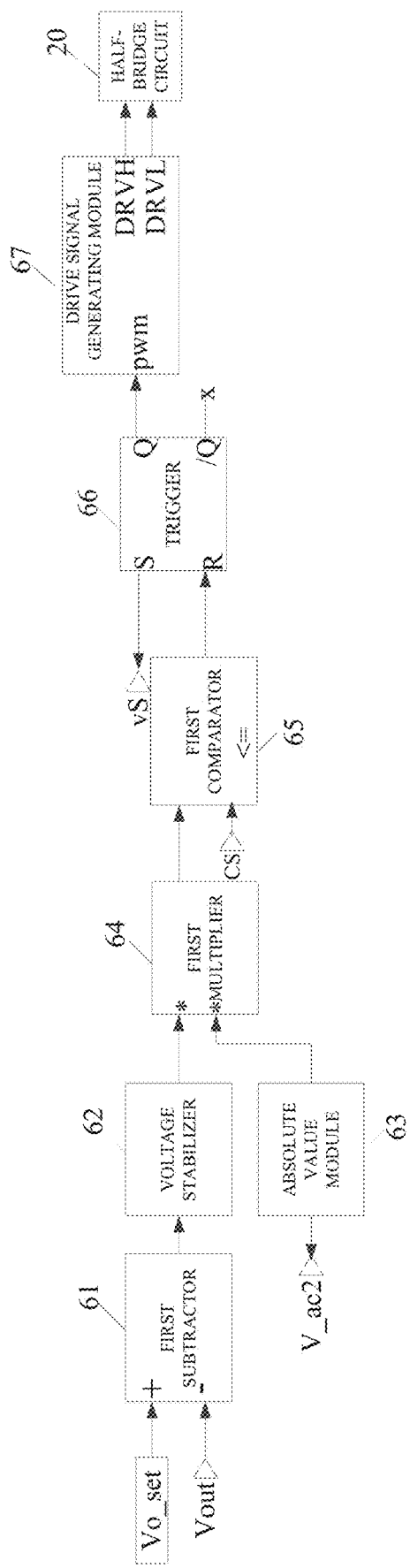
FIG. 7 shows a structural schematic diagram of a control circuit achieving the high power factor rectification function.

In an embodiment, the control circuit may implement the method shown in Step 101 to Step 105 through a digital circuit or an analog circuit. As shown in FIG. 7, the control circuit includes: a first subtractor 61, a voltage stabilizer 62, a first multiplier 64, an absolute value module 63, a first comparator 65, a trigger 66, and a drive signal generating module 67.

The first subtractor 61 includes a first input end, a second input end, and an output end. The first input end is configured to input an instantaneous voltage value Vout of the DC actually output by the converter, the second input end is configured to input a voltage value Vo_set of a preset output DC voltage signal. The output end is connected with the voltage stabilizer 62, the first subtractor 61 is configured to subtract the DC voltage signal actually output by the converter from the preset output DC voltage signal, and output an output voltage error value of the converter to the voltage stabilizer 62 via the output end.

An output end of the voltage stabilizer 62 is connected to the first multiplier 64. The voltage stabilizer 62 is configured to amplify and process the output voltage error value, and output the voltage loop output value to the first multiplier 64.

An input end of the absolute value module 63 is configured to receive the instantaneous voltage value V_ac2 of the AC input at the AC input end, and an output end of the absolute value module 63 is connected to the first multiplier 64. The absolute value module 63 is configured to calculate an absolute value of the instantaneous voltage value of the AC input at the AC input end, and output the absolute value of the instantaneous voltage value of the AC to the first multiplier 64. Since the AC input at the AC input end can be positive or negative, before inputting into the multiplier, the AC input at the AC input end should be subject to absolute value processing first.

The output end of the first multiplier 64 is connected to the first comparator 65, the first multiplier 64 is configured to multiply the instantaneous voltage value of the AC with the voltage loop output value of the converter, to obtain the peak current given value of the transformer 40, and output the peak current given value of the transformer 40 to the first comparator 65.

The output end of the first comparator 65 is connected to the trigger 66, and the first comparator 65 is configured to output a high-level signal to the trigger 66 when the peak current given value of the transformer 40 is greater than the instantaneous current value CS of the current signal on the primary side of the transformer 40, and output a low-level signal to the trigger 66 when the peak current given value of the transformer is less than or equal to the instantaneous current value of the current signal on the primary side of the transformer 40.

The trigger 66 is configured to receive signals output by the first comparator 65, and output PWM signals to the drive signal generating module 67. The trigger 66 in this embodiment is an RS trigger. The RS trigger includes an S input end, an R input end, and a Q output end, where the R input end is connected with the output end of the comparator 65, and the falling edge vS of the drive signal for the lower bridge switch Q2 is introduced into the S input end.

The drive signal generating module 67 is connected to the Q end of the RS trigger, and configured to generate two PWM drive signals that are complementary for the upper bridge switch Q1 and the lower bridge switch Q2 respectively, to control on and off of the upper bridge switch Q1 and the lower bridge switch Q2. The PWM drive signal for the upper bridge is at the same level as that output at the output end of the Q output end of the RS trigger, and the PWM drive signal for the lower bridge is at a level that is complementary to the level of the PWM drive signal for the upper bridge.

Next, how the control circuit controls the on-duration of the lower bridge switch Q2 to achieve the soft switching function is described.

Figure 8:
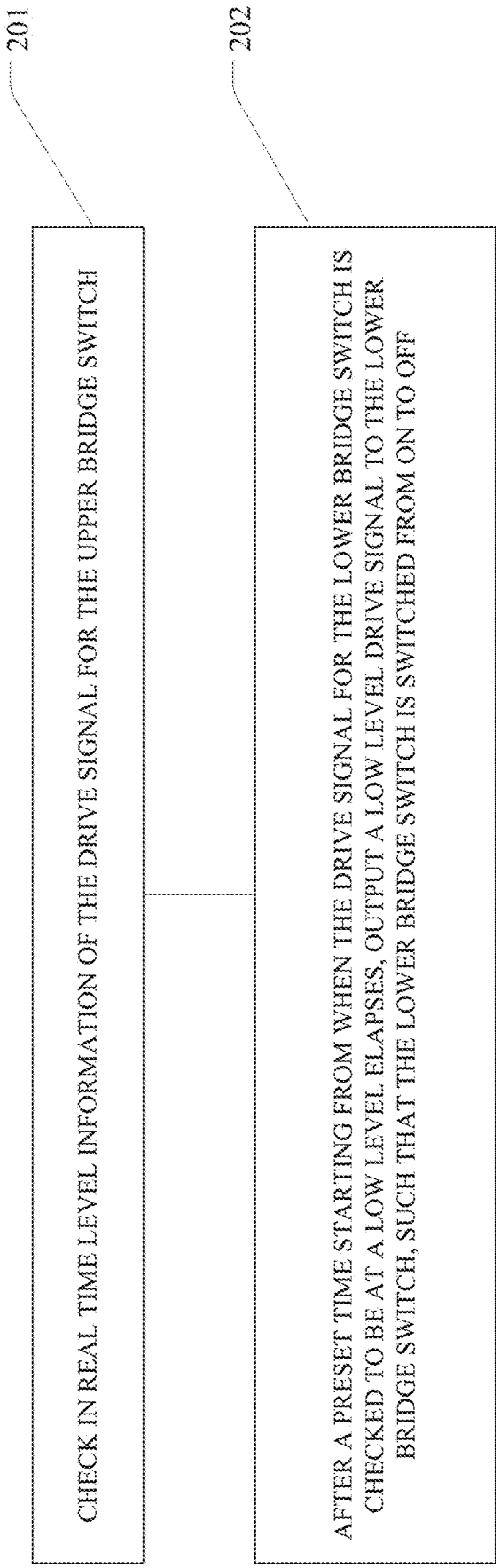
FIG. 8 shows a flowchart of a control method for a converter achieving a soft switching function.

Referring to FIG. 8, which shows a flowchart of a control method for an asymmetric half-bridge flyback circuit-based converter according to another embodiment, in the following, "control method" for short. The control method includes step 201 and step 202, as detailed below.

Step 201: level information of the drive signal for the upper bridge switch Q1 is checked in real time.

Step 202: the lower bridge switch Q2 is switched on when the drive signal for the upper bridge switch Q1 is at a low level, that is, the lower bridge switch Q2 is switched on when the level of the drive signal for the upper bridge switch Q1 is pulled down. After a preset time starting from when the lower bridge switch Q2 is switched on has elapsed, a trigger signal is generated; in response to the trigger signal, a low-level drive signal is output to the lower bridge switch Q2 to switch the lower bridge switch Q2 from ON to OFF, meanwhile, a high-level drive signal is output to the upper bridge switch Q1 to switch on the upper bridge switch Q1. The above preset time is the time when the lower bridge switch Q2 is switched on, which is determined according to a difference between a positive peak current and a negative peak current on the primary side of the transformer, the instantaneous voltage value of the DC output by the converter, and the excitation inductance of the transformer.

Figure 9:
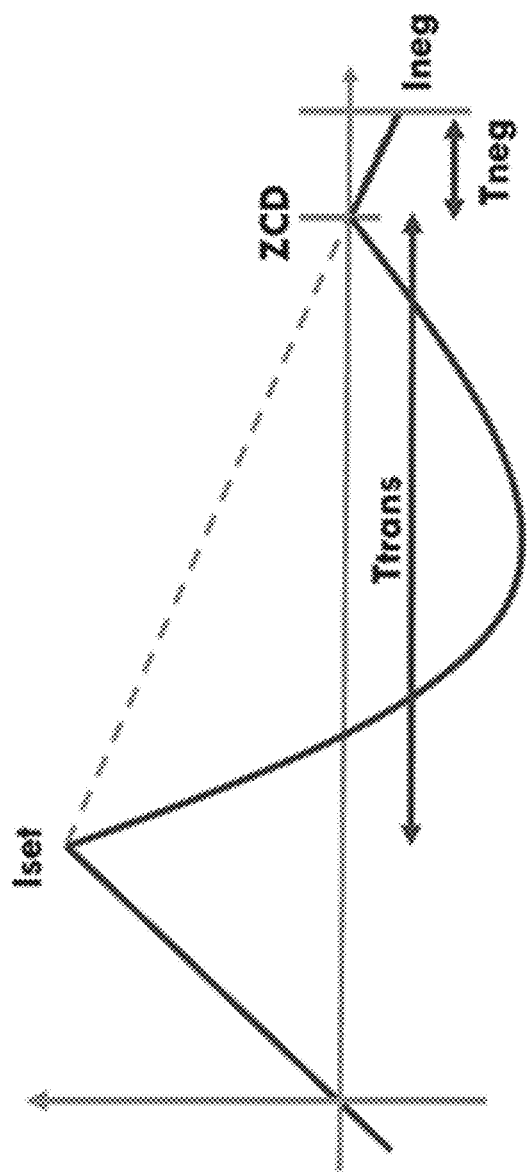
FIG. 9 shows a waveform diagram of current flowing through the primary side of a transformer.

As shown in FIG. 9, which is a waveform diagram of current flowing through the primary side of transformer, where Iset represents a positive peak current value, Ineg represents a negative peak current value. Ineg is a key factor for implementing zero-voltage switching of the half-bridge module 20 connected to the primary side of the transformer 40. After the lower bridge switch Q2 is switched off, the current in the transformer 40 and the resonant circuit 30 is not zero, and the current flows from the inductor L1 in the resonant circuit to the midpoint between the upper bridge switch Q1 and the lower bridge switch Q2 in the half-bridge module 20. Therefore, after the lower bridge switch Q2 is switched off, the midpoint of the half-bridge module 20 is charged with the current. Since parasitic capacitance exits in all switches in the half-bridge module, for example, the capacitance such as MOSFET is described as the capacitance Coss of the drain electrode and the source electrode, and is typically below 1nF, therefore, according to a bridge-arm capacitor, time from when the transformer charges the bridge-arm capacitor to when the voltage rises to Vin is determined as time required to realize zero-voltage switch-off for upper bridge switch Q1, or dead time TD from when the lower bridge switch Q2 is switched off to when the upper bridge switch Q1 is switched on is fixed so as to calculate time required to realize zero-voltage switch-off for upper bridge switch Q1, that is:

$$Ineg = \frac{2*Coss*Vin}{Td}$$

In one embodiment, the preset time $T_{LG}$ is calculated according to the following formula:

$$T_{LG} = \frac{(I_{set} - I_{neg})*Lmag}{Vout*Np}$$

Where Iset represents the positive peak current value of the primary side of the transformer, Ineg represents the negative peak current value of the primary side of the transformer, Lmag is the excitation inductance of the transformer, Vout is the instantaneous voltage value of the DC output by the converter, and Np is a turn ratio between the primary side and the secondary side of the transformer.

It should be noted that, in an ideal state, the upper bridge switch Q1 and the lower bridge switch Q2 are switched on alternately, that is, when the upper bridge switch Q1 is switched on, the lower bridge switch Q2 is switched off immediately; or when the lower bridge switch Q2 is switched on, the upper bridge switch Q1 is switched off immediately. However, in practical use, there will be a dead time TD between the alternate switching-on of the upper bridge switch Q1 and the lower bridge switch Q2, for example, after the level of the drive signal for the upper bridge switch Q1 is pulled down, the level of the drive signal for the lower bridge switch Q1 is set high after a dead time TD elapsed, if the soft switching function is not considered.

According to the formula for calculating the preset time $T_{LG}$, a control strategy for the control circuit to control the upper bridge switch Q1 to realize zero-voltage switch-off is as follows: when the level of the drive signal of the upper-bridge switch Q1 is pulled down, reset the timer corresponding to the lower-bridge switch Q2, the timer can be realized by a resettable integrator. In terms of specific circuits, a capacitor can be charged by a fixed current source, and in terms of digital control software, the timer can be realized by a counter with a fixed beat. After the timer is reset, the output value of the timer starts to increase, the output value is embodied as output voltage in a circuit, and embodied as an output numerical value in software. When the output value of the counter is greater than the time length value as calculated above, a high-level reset signal PWM is sent to an SR trigger.

Figure 10:
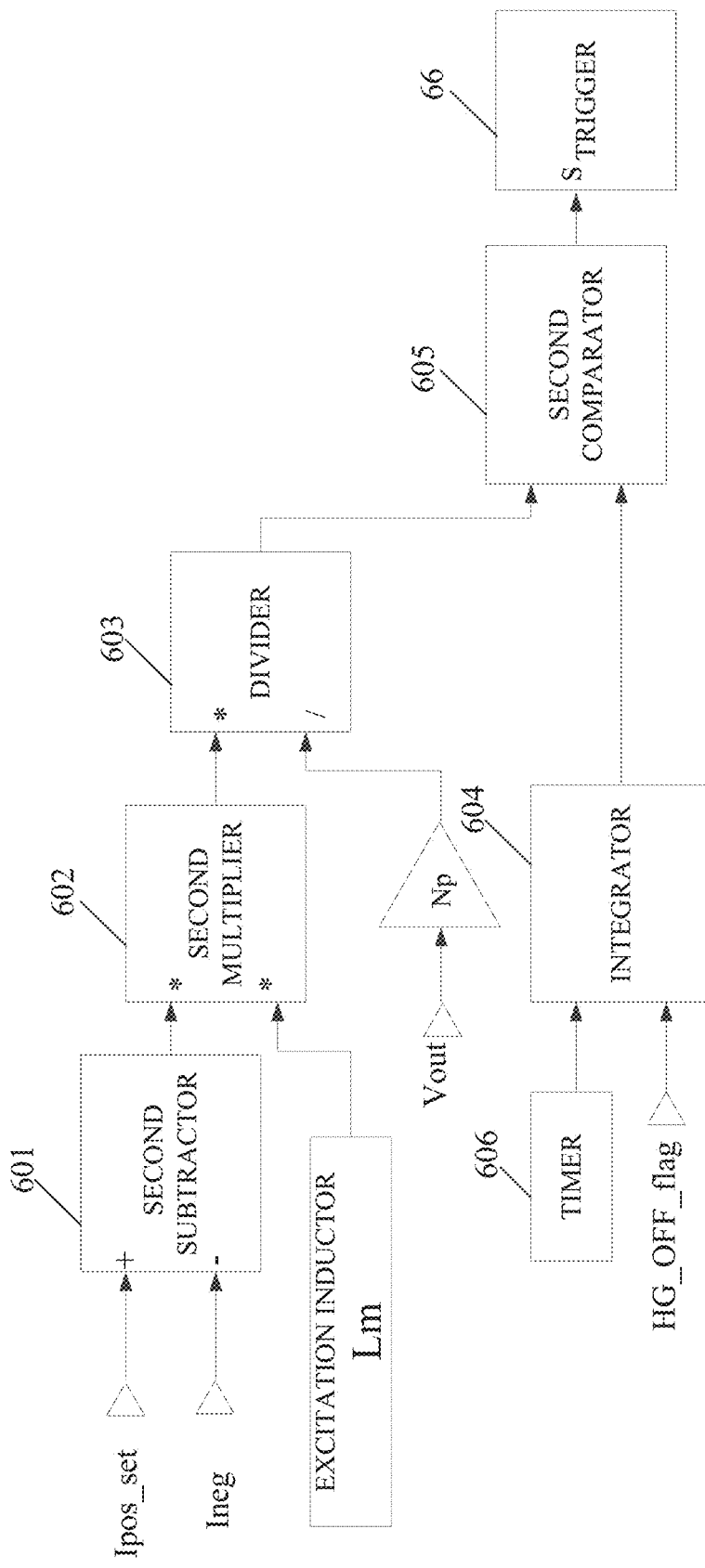
FIG. 10 shows a structure schematic diagram of a control circuit achieving the soft switching function.

In one embodiment, the control circuit can implement the method shown in step 201 to step 202 through a digital circuit or an analog circuit, reference is made to FIG. 10, for example, the control circuit includes a second subtractor 601, a second multiplier 602, a divider 603, an integrator 604, and a second comparator 605.

The second subtractor 601 is configured to receive a negative peak current value, the second input end is configured to receive a positive peak current value Ipos_set of the primary side of the transformer 40. The second subtractor 601 is configured to subtract the negative peak current value from the positive peak current value of the primary side of the transformer 40, to obtain a difference between the positive peak current and the negative peak current of the primary side of the transformer 40, and output the different to the second multiplier 602.

The second multiplier 602 is configured to multiply the excitation inductance Lm of the transformer with the difference between the positive peak current and the negative peak current, and output the result thus obtained to the divider 603.

The divider 603 is configured to divide the result of multiplication output by the second multiplier 602 by a product of the instantaneous voltage value Vout of the DC output by the converter and a turn ratio Np of the transformer 40, to obtain a preset time, and output the preset time to the second comparator 605.

The integrator 604 is configured to count the actual time in which the drive signal for the upper bridge switch Q1 is at a low level, and output the actual time to the second comparator 605. In an actual application, the dead time should be taken into consideration, and one input end of the integrator 604 is configured to receive a trigger signal from a timer 606 for timing the dead time, and the other input end of the integrator 604 is configured to receive a falling edge signal Q1_OFF_flag of the drive signal for the upper bridge switch Q1, where the timer 606 is configured to output the trigger signal when the timing thereof reaches the dead time.

The second comparator 605 is configured to output a low-level signal to the trigger when the actual time is less than or equal to the preset time, and output a high-level signal to the trigger 66 when the actual time is greater than the preset time. As described before, the trigger 66 is an RS trigger, after the second comparator 605 outputs the high-level signal to the S input end of the RS trigger, the RS trigger will be set so that the Q output end outputs a high-level signal, such that the control circuit finally outputs a high-level drive signal for the upper bridge switch Q1 and a low-level drive signal for the lower bridge switch Q2, to switch off the lower bridge switch Q2.

It should be noted that each circuit module of the above control circuit can be realized through existing circuit structures that can realize the circuit functions, and will not be repeated herein.

Figure 11:
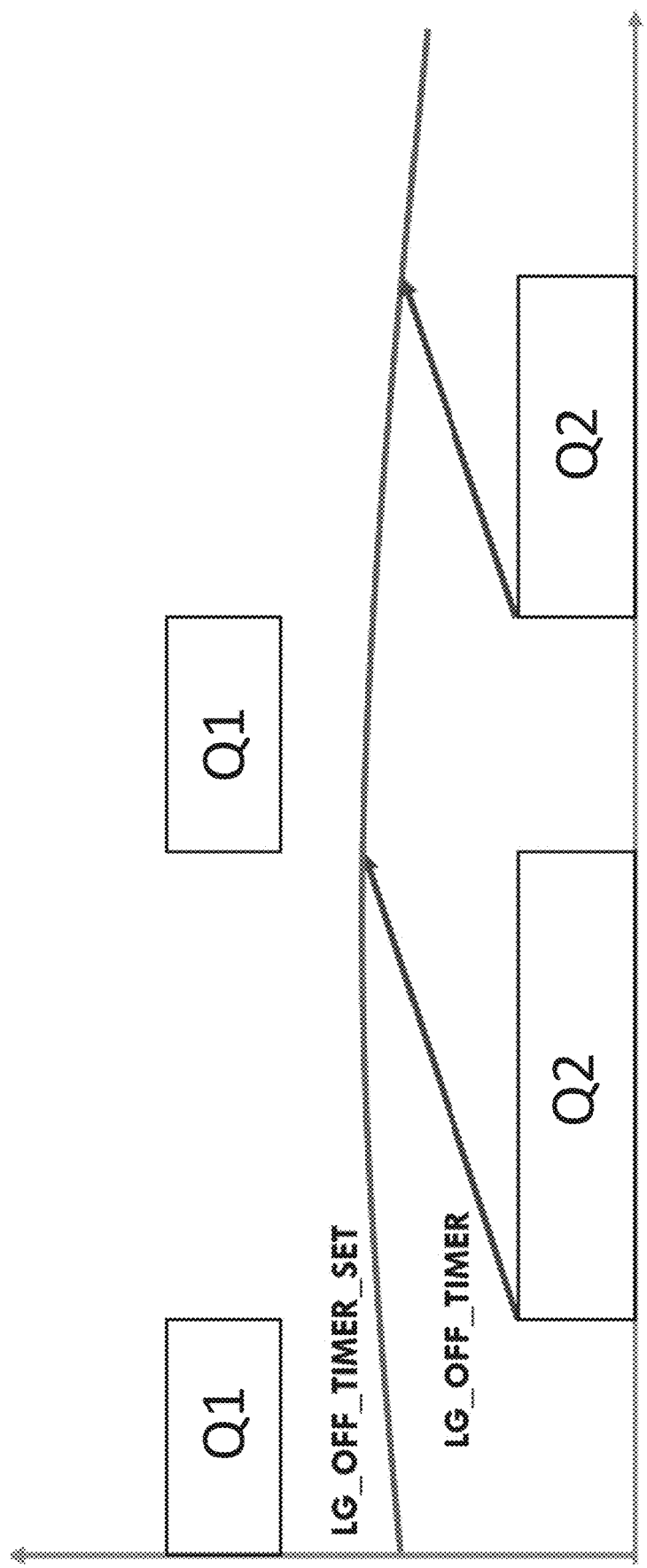
FIG. 11 shows a schematic diagram of an operating waveform of a converter.

As illustrated in FIG. 11, the on-duration of the lower bridge switch Q2 is adjusted in real time according to the above method in one sine period, as such, the lower bridge switch Q2 can be switched off when the current of the primary side of the transformer is of a negative current peak value. In the dead time TD, the midpoint of the half-bridge module 20 can be charged to an input voltage Vin with the current, and therefore, zero-voltage switching of the upper bridge switch Q1 of the converter can be realized. Where LG_OFF_TIMER_SET is an on-duration setting value of the lower bridge switch Q2, LG_OFF_TIMER is a timer for on-duration of the lower bridge switch Q2, and on-duration control of the Q2 can be realized by the integrator and the comparator.

Figure 12:
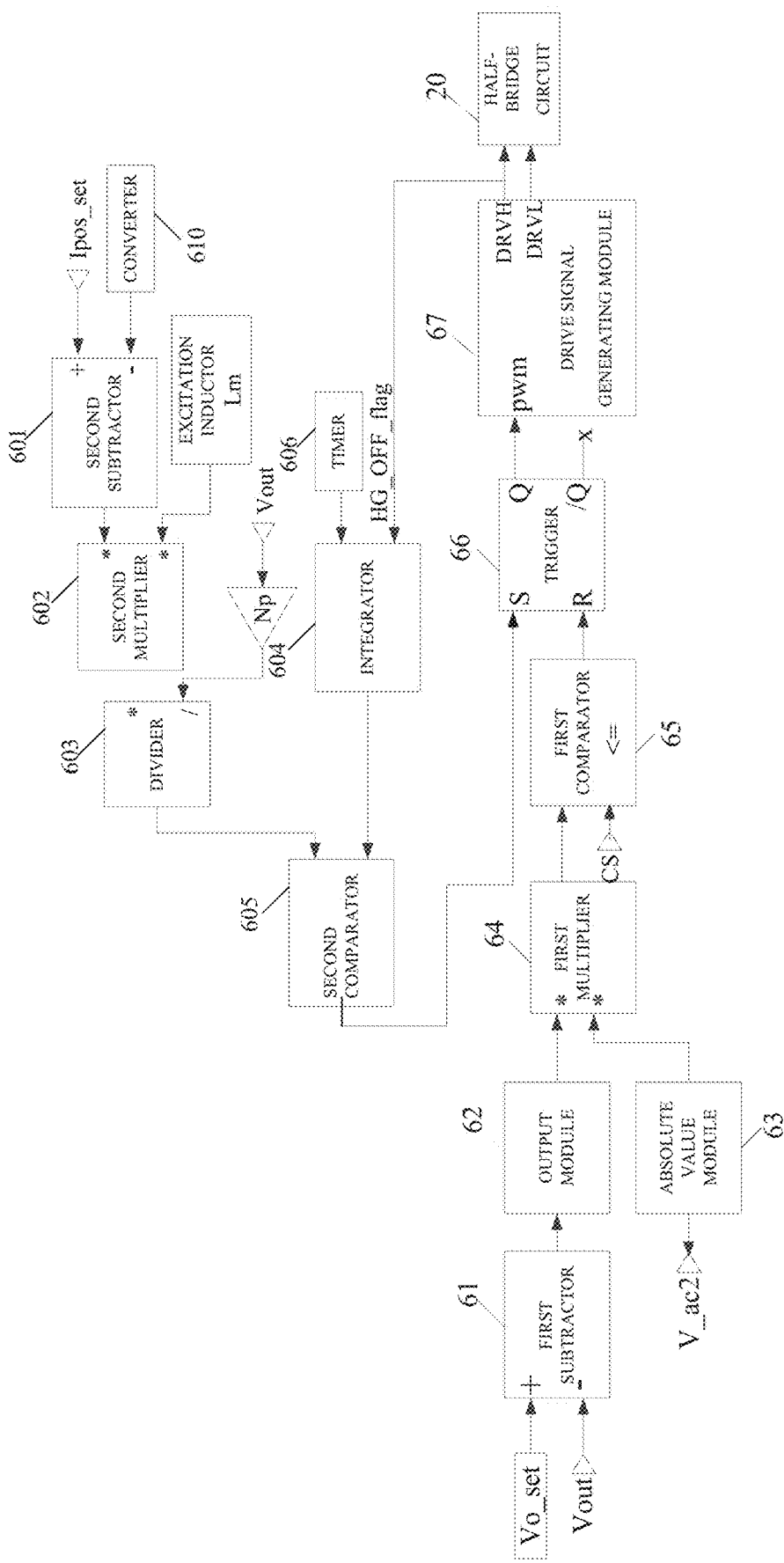
FIG. 12 shows an overall structure schematic diagram of the control circuit in FIG. and the control circuit in FIG. 10.
Figure 13:
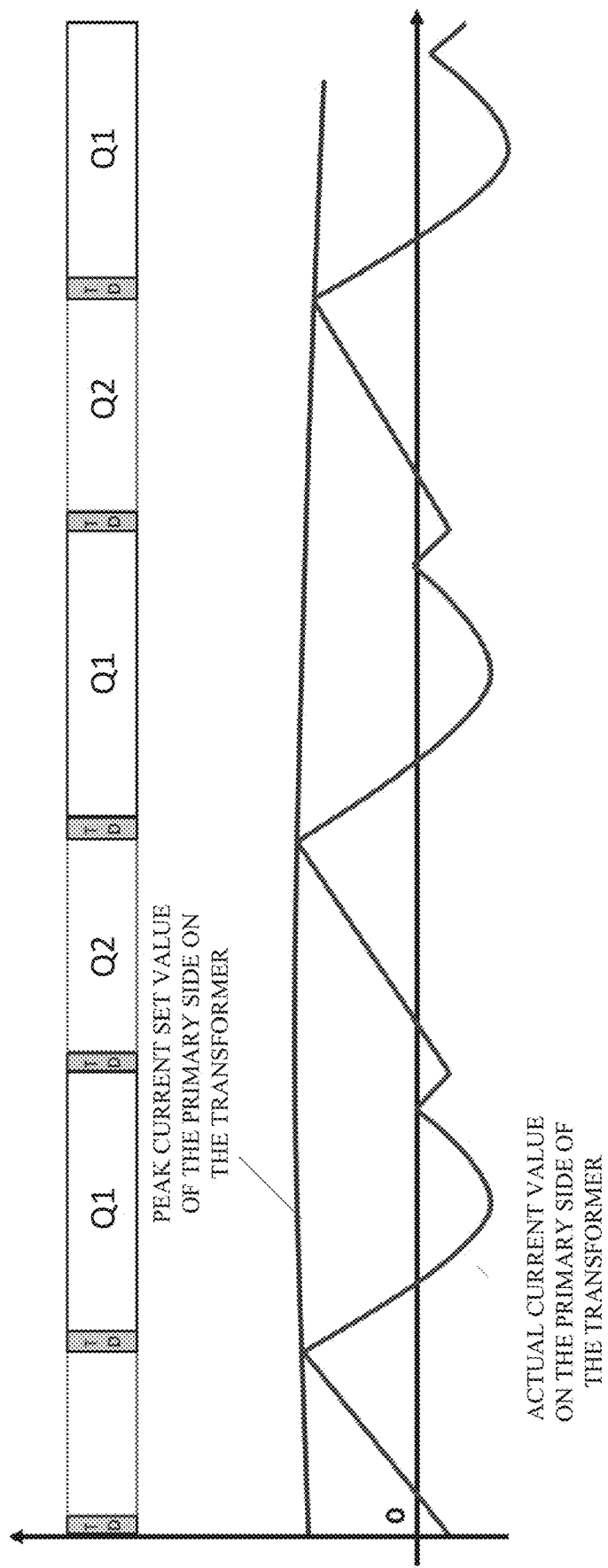
FIG. 13 shows a running sequence diagram of a converter.
Figure 14:
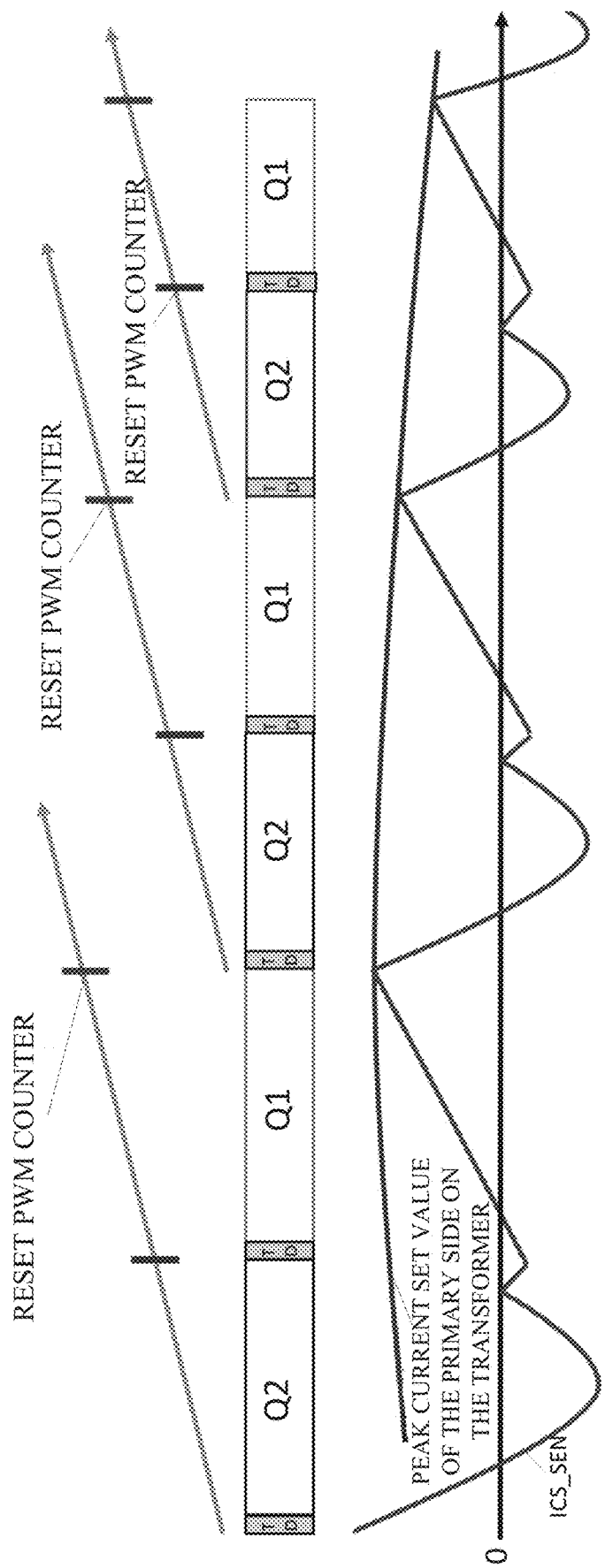
FIG. 14 shows a schematic diagram of a software-implemented control method.

As illustrated in FIG. 12, which is a diagram illustrating a general circuit structure of control circuits in FIG. 7 and FIG. 9, the running sequence of the general circuit is illustrated in FIG. 13. In addition, when using DSP or digital DPWM for control, the length of the preset time T_LG can be calculated directly with software, and the PWM period can be refreshed with peak current detection to achieve system control. As illustrated in FIG. 14, the implementation method is as follows: an EPWM module of a DSP is used as a PWM generator, a system samples an instantaneous voltage value of an output DC, outputs the instantaneous voltage value, and samples a current ICS_SEN on the primary side of the transformer. By using the following formula in software, $$T_{LG} = \frac{(I_{set} - I_{neg}) * Lmag}{Vout * Np}$$

the off-time (that is, off time-length) of the lower bridge switch Q2 is directly calculated and written into the COMPA digital comparator, and is used for controlling the on-duration of the lower bridge switch Q2. Dead time TD is inserted when the value of the PWM counter of the EPWM module is zero, Q2 is pulled up, and when the counter is incremented to the value written into the COMPA, Q2 is pulled down and the dead time TD is inserted, and then Q1 is pulled up. After Q1 is pulled up, the half bridge high-side switch is controlled to be switched on, and the current flows into the transformer from the grid and rises linearly with the on-duration, and the voltage flows a sampling resistor will also rise. When the ICS_SEN (a sampled signal of the current of the primary side of the transformer) is higher than the set value Ipk_set of the sine envelope calculated by the control loop, Q1 is pulled down and the PWM counter is reset simultaneously. By means of an analog comparator, the EPWM module inside the DSP can compare the current set value Ipk_set obtained by DAC conversion on the digital quantity calculated and output by the control loop and the actual sampled value ICS_SEN of the current of the transformer. When the comparator acts, it is configured as a DCAEVT1 event, and the purpose of pulling down the output of Q1 and resetting the PWM counter is realized through the event. The PWM counter restarts counting from zero, and Q2 is pulled up after the dead time TD is inserted. As such, peak current mode control of the switch Q1 can be realized, and Q2 is switched off when the current of the transformer is of a negative set value, therefore, both the upper bridge switch Q1 and the lower bridge switch Q2 can achieve zero-voltage switch-off.

Figure 15:
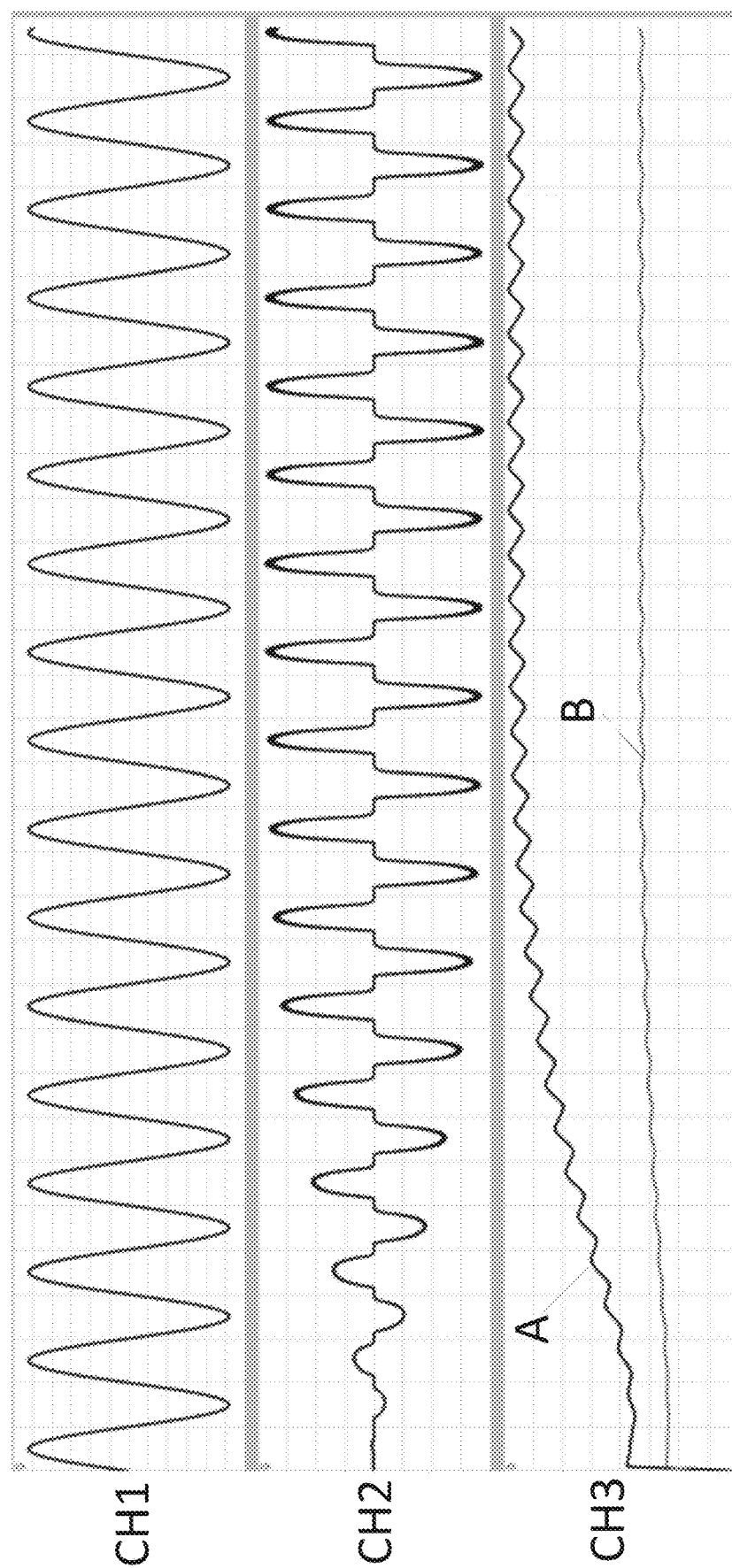
FIG. 15 shows a schematic diagram of the simulation result.

FIG. 15 shows the simulation effect of the control method provided in this embodiment, where CH1 represents the AC voltage (180 VAC), CH2 represents the AC current, CH3 is the voltage (A\28V) and load current (B\5A) isolated and output by the converter.

The present disclosure is described with embodiments, which are only used to help understand the present invention, rather than limiting the present disclosure. For those skilled in the art, according to the idea of the present disclosure, various simple deductions, deformations, or replacements can also be made.

What is claimed is:

1. An asymmetric half-bridge flyback circuit-based converter, wherein the converter is configured to convert an alternating current (AC) input at an AC input end into a direct current (DC) within a preset voltage value range, the converter comprising: a full-bridge rectifier circuit, a half-bridge circuit, a resonant circuit, a transformer, a load output circuit, and a control circuit; wherein the full-bridge rectifier circuit is configured to perform full-bridge rectification on the AC input at the AC input end to obtain a unidirectional pulsating DC and output the unidirectional pulsating DC to the half-bridge circuit;

the half-bridge circuit comprises an upper bridge switch and a lower bridge switch, and the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer;

the resonant circuit is configured to perform auxiliary communication on the primary side of the transformer;

the transformer is configured to convert the AC on the primary side of the transformer into an AC having a preset voltage value on a secondary side;

the load output circuit is configured to convert the AC having the preset voltage value on the secondary side of the transformer into a DC and output the DC;

the control circuit is configured to obtain a DC voltage signal actually output by the converter and a preset output DC voltage signal, determine a voltage loop output value of the converter according to the DC voltage signal actually output and the preset output DC voltage signal, and generate a drive signal for the upper bridge switch and a drive signal for the lower bridge switch of the half-bridge circuit according to the voltage loop output value of the converter, an instantaneous voltage value of the AC input at the AC input end, an instantaneous current value of a current signal on the primary side of the transformer, to make the current signal on the primary side of the transformer change according to a regularity of the AC voltage signal input at the AC input end, wherein the upper bridge switch and the lower bridge switch are configured to be switched on alternately;

the control circuit is configured to detect in real time level information of the drive signal for the upper bridge switch, and generate a trigger signal after a preset time elapsed upon detecting that the drive signal for the upper bridge switch is at a low level; the control circuit is configured to output a low-level drive signal to the lower bridge switch in response to the trigger signal to switch off the lower bridge switch, and output a high-level drive signal to the upper bridge switch after a dead time to switch on the upper bridge switch; and the preset time is determined according to a difference between a positive peak current value and a negative peak current value on the primary side of the transformer, an instantaneous voltage value of the DC output by the converter, and an excitation inductance of the transformer.

2. The converter according to claim 1, wherein the preset time is determined according to a difference between a positive peak current value and a negative peak current value on the primary side of the transformer, the instantaneous voltage value of the DC output by the converter, and parameters of the excitation inductance of the transformer, comprising:

the preset time $T_{LG}$ is determined according to the following formula:

$$T_{LG} = \frac{(I_{set} - I_{neg}) * Lmag}{Vout * Np}$$

wherein $I_{set}$ represents the positive peak current value on the primary side of the transformer, $I_{neg}$ represents the negative peak current value on the primary side of the transformer, Lmag represents the excitation inductance of the transformer, Vout represents the instantaneous voltage value of the DC output by the converter, and Np represents a turn ratio between the primary side and secondary side of the transformer.

3. The converter according to claim 1, wherein the drive signal for the upper bridge switch and the drive signal for the lower bridge switch of the half-bridge circuit are generated according to the voltage loop output value of the converter, the instantaneous voltage value of the AC input at the AC input end, and the instantaneous current value of the current signal on the primary side of the transformer, comprising:

a peak current given value of the transformer obtained by multiplying the voltage loop output value with an absolute value of the instantaneous voltage value of the AC input at the AC input end; and the drive signal for the upper bridge switch and the drive signal for the lower bridge switch of the half-bridge circuit, which are generated according to the peak current given value of the transformer and the instantaneous current value of the current signal on the primary side of the transformer, and are configured to change the current signal on the primary side of the transformer according to the regularity of the AC voltage signal input at the AC input end.

4. The converter according to claim 3, wherein generating the drive signal for the upper bridge switch and the drive signal for the lower bridge switch of the half-bridge circuit according to the peak current given value of the transformer and the instantaneous current value of the current signal on the primary side of the transformer comprises:

the peak current given value of the transformer is compared with the instantaneous current value of the current signal on the primary side of the transformer;

the high-level drive signal is output to the upper bridge switch to drive the upper bridge switch to be switched on, if the peak current given value of the transformer is greater than the instantaneous current value of the current signal on the primary side of the transformer, wherein the drive signal for the upper bridge switch and the drive signal for the lower bridge switch are complementary; and the low-level drive signal is output to the upper bridge switch to drive the upper bridge switch to be switched off, if the peak current given value of the transformer is less than the instantaneous current value of the current signal on the primary side of the transformer, wherein the drive signal for the upper bridge switch and the drive signal for the lower bridge switch are complementary.

5. The converter according to claim 1, wherein the control circuit comprises: a first subtractor, a voltage stabilizer, a first multiplier, an absolute value module, a first comparator, a trigger, and a drive signal generating module, wherein the first subtractor is configured to subtract the DC voltage signal actually output by the converter from the preset output DC voltage signal, and output an output voltage error value to the voltage stabilizer;

the voltage stabilizer is configured to amplify and process the output voltage error value, and output the voltage loop output value to the first subtractor;

the absolute value module is configured to calculate an absolute value of the instantaneous voltage value of the AC input at the AC input end, and output the absolute value of the instantaneous voltage value of the AC to the first multiplier;

the first multiplier is configured to multiply the instantaneous voltage value of the AC with the voltage loop output value of the converter to obtain the peak current given value of the transformer, and output the peak current given value of the transformer to the first comparator;

the first comparator is configured to output a high-level signal to the trigger when the peak current given value of the transformer is greater than the instantaneous current value of the current signal on the primary side of the transformer, and output a low-level signal to the trigger when the peak current given value of the transformer is less than the instantaneous current value of the current signal on the primary side of the transformer;

the trigger is configured to receive the signal output by the first comparator and output a PWM signal to the drive signal generating module; and the drive signal generating module is configured to generate two complementary PWM drive signals according to the PWM signal, and output the two complementary PWM drive signals to the upper bridge switch and the lower bridge switch respectively.

6. The converter according to claim 5, wherein the control circuit further comprises: a second subtractor, a second multiplier, a divider, an integrator, and a second comparator, wherein the second subtractor is configured to subtract the negative peak current value from the positive peak current value of the primary side of the transformer to obtain a difference between the positive peak current value and the negative peak current value of the primary side of the transformer, and output the difference to the second multiplier;

the second multiplier is configured to multiply the excitation inductance of the transformer with the difference between the positive peak current value and the negative peak current value, and output a multiplication result to the divider;

the divider is configured to divide the multiplication result output by the second multiplier by a product of the instantaneous voltage value of the DC output by the converter and a turn ratio of the transformer to obtain a preset time, and output the preset time to the second comparator;

the integrator is configured to count an actual time in which the drive signal for the upper bridge switch is at low-level, and output the actual time to the second comparator;

the second comparator is configured to output the low-level signal to the trigger when the actual time is less than or equal to the preset time, and output the high-level signal to the trigger when the actual time is greater than the preset time.

7. The converter according to claim 1, wherein the full-bridge rectifier circuit comprises: a diode D1, a diode D2, a diode D3, a diode D4, and a capacitor C1, wherein an anode of the diode D1 and a cathode of the diode D2 are connected to a negative electrode of the AC input end, an anode of the diode D3 and a cathode of diode D4 are connected to a positive electrode of the AC input end, a cathode of the diode D1 and a cathode of the diode D3 are connected to one end of the capacitor C1, and an anode of the diode D2 and an anode of diode D4 are connected to the other end of the capacitor C1; or the half-bridge circuit comprises: an upper bridge switch Q1 and a lower bridge switch Q2;

the upper bridge switch Q1 comprises a first electrode, a second electrode, and a control electrode, the first electrode of the upper bridge switch Q1 is connected to a positive output end of the full-bridge rectifier circuit, the second electrode of the upper bridge switch Q1 is connected to one end of the resonant circuit, the control electrode of the upper bridge switch Q1 is connected to the control circuit, the control electrode of the upper bridge switch Q1 is configured to receive the drive signal output by the control circuit to control the upper bridge switch Q1 to be switched on or switched off;

the lower bridge switch Q2 comprises a first electrode, a second electrode, and a control electrode, the first electrode of the lower bridge switch Q2 is connected to one end of the resonant circuit, the second electrode of the lower bridge switch Q2 is connected to the other end of the resonant circuit and a negative output end of the full-bridge rectifier circuit, the control electrode of the lower bridge switch Q2 is connected to the control circuit, the control electrode of the lower bridge switch Q2 is configured to receive the drive signal output by the control circuit to control the lower bridge switch Q2 to be switched on or switched off; or the resonant circuit comprises an inductor L1 and a capacitor C2;

one end of the inductor L1 is connected to the second electrode of the upper bridge switch Q1, the other end of the inductor L1 is connected to one end of the primary side of the transformer, the other end of the primary side of the transformer is connected to one end of the capacitor C2, and the other end of the capacitor C2 is connected to the second electrode of the lower bridge switch Q2; or the load output circuit comprises a diode D5 and a capacitor C3; and an anode of the diode D5 is connected to one end of the secondary side of the transformer, a cathode of the diode D5 is connected to one end of the capacitor C3, and the other end of the capacitor C3 is connected to the other end of the secondary side of the transformer.

8. An asymmetric half-bridge flyback circuit-based converter, wherein the converter is configured to convert an alternating current (AC) input at an AC input end into a direct current (DC) within a preset voltage value range, the converter comprising: a full-bridge rectifier circuit, a half-bridge circuit, a resonant circuit, a transformer, a load output circuit, and a control circuit; wherein the full-bridge rectifier circuit is configured to perform full-bridge rectification on the AC input at the AC input end to obtain a unidirectional pulsating DC and output the unidirectional pulsating DC to the half-bridge circuit;

the half-bridge circuit comprises an upper bridge switch and a lower bridge switch, and the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer;

the resonant circuit is configured to perform auxiliary communication on the primary side of the transformer;

the transformer is configured to convert the AC on the primary side of the transformer into an AC having a preset voltage value on a secondary side;

the load output circuit is configured to convert the AC having the preset voltage value on the secondary side of the transformer into a DC and output the DC;

the control circuit is configured to obtain a DC voltage signal actually output by the converter and a preset output DC voltage signal, determine a voltage loop output value of the converter according to the DC voltage signal actually output and the preset output DC voltage signal, and generate a drive signal for the upper bridge switch and a drive signal for the lower bridge switch of the half-bridge circuit according to the voltage loop output value, an instantaneous voltage value of the AC input at the AC input end, an instantaneous current value of a current signal on the primary side of the transformer, to make the current signal on the primary side of the transformer change according to a regularity of the AC voltage signal input at the AC input end.

9. A control method for an asymmetric half-bridge flyback circuit-based converter, wherein the converter is configured to convert an alternating current (AC) input at an AC input end into a direct current (DC) within a preset voltage value range, the converter comprising: a full-bridge rectifier circuit, a half-bridge circuit, a resonant circuit, a transformer, a load output circuit, and a control circuit; wherein the full-bridge rectifier circuit is configured to perform full-bridge rectification on the AC input at the AC input end to obtain a unidirectional pulsating DC and output the unidirectional pulsating DC to the half-bridge circuit;

the half-bridge circuit comprises an upper bridge switch and a lower bridge switch, and the half-bridge circuit is configured to convert alternately, by switching on the upper bridge switch and the lower bridge switch alternately, the unidirectional pulsating DC into an AC having a voltage amplitude changing with a waveform of an AC voltage input at the AC input end and outputting the AC to a primary side of the transformer;

the resonant circuit is configured to perform auxiliary communication on the primary side of the transformer;

the transformer is configured to convert the AC on the primary side of the transformer into an AC having a preset voltage value on a secondary side;

the load output circuit is configured to convert the AC having the preset voltage value on the secondary side of the transformer into a DC and output the DC;

the control circuit is configured to generate a drive signal for the upper bridge switch and a drive signal for the lower bridge switch of the half-bridge circuit, and outputs the drive signals to the upper bridge switch and the lower bridge switch to control the upper bridge switch and the lower bridge switch to be switched on alternately;

wherein the control method comprises:

obtaining a DC voltage signal actually output by the converter and a preset output DC voltage signal;

determining a voltage loop output value of the converter according to the DC voltage signal actually output and the preset output DC voltage signal;

generating the drive signal for the upper bridge switch and the drive signal for the lower bridge switch of the half-bridge circuit according to the voltage loop output value of the converter, an instantaneous voltage value of the AC input at the AC input end, an instantaneous current value of a current signal on the primary side of the transformer, to make the current signal on the primary side of the transformer change according to a regularity of the AC voltage signal input at the AC input end, wherein the upper bridge switch and the lower bridge switch are configured to be switched on alternately;

detecting in real time level information of the drive signal for the upper bridge switch; and generating a trigger signal after a preset time elapsed upon detecting that the drive signal of the upper bridge switch is at a low level, outputting a low-level drive signal to the lower bridge switch in response to the trigger signal to switch off the lower bridge switch, and outputting a high-level drive signal to the upper bridge switch to switch on the upper bridge switch.

* * * * *